(12) United States Patent
Kim et al.

(10) Patent No.: US 9,362,983 B2
(45) Date of Patent: Jun. 7, 2016

(54) METHOD AND APPARATUS FOR CONTROLLING RESONANCE BANDWIDTH IN A WIRELESS POWER TRANSMISSION SYSTEM

(75) Inventors: Nam Yun Kim, Seoul (KR); Sang Wook Kwon, Seongnam-si (KR); Eun Seok Park, Suwon-si (KR); Young Ho Ryu, Yongin-si (KR); Young-tack Hong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1012 days.

(21) Appl. No.: 13/096,014

(22) Filed: Apr. 28, 2011

(65) Prior Publication Data

US 2011/0266881 A1 Nov. 3, 2011

(30) Foreign Application Priority Data

Apr. 28, 2010 (KR) ........................ 10-2010-0039576

(51) Int. Cl.
*H02J 17/00* (2006.01)
*H04B 5/00* (2006.01)
*H02J 5/00* (2016.01)

(52) U.S. Cl.
CPC .............. *H04B 5/0037* (2013.01); *H02J 5/005* (2013.01); *H04B 5/0081* (2013.01)

(58) Field of Classification Search
CPC ........... H02J 17/00; H02J 5/005; H02J 7/025; H02J 3/01; H01F 38/14; B60L 11/182; B60L 11/1829; B60L 11/1831; Y02T 90/122
See application file for complete search history.

(56) References Cited

U.S. PATENT DOCUMENTS

| 2004/0037363 | A1 | 2/2004 | Norsworthy et al. |
| 2006/0202907 | A1* | 9/2006 | Grossman et al. ............ 343/895 |
| 2007/0074580 | A1* | 4/2007 | Fallah-Rad et al. ............ 73/786 |
| 2008/0116847 | A1 | 5/2008 | Loke et al. |
| 2009/0015075 | A1 | 1/2009 | Cook et al. |
| 2009/0051224 | A1* | 2/2009 | Cook et al. .................... 307/104 |
| 2009/0286476 | A1 | 11/2009 | Toncich et al. |
| 2010/0045114 | A1 | 2/2010 | Sample et al. |
| 2010/0068998 | A1 | 3/2010 | Zyambo et al. |
| 2010/0102641 | A1 | 4/2010 | Joannopoulos et al. |

(Continued)

FOREIGN PATENT DOCUMENTS

| CN | 102656771 A | 9/2012 |
| CN | 102696166 A | 9/2012 |
| CN | 102870316 A | 1/2013 |

(Continued)

OTHER PUBLICATIONS

International Search Report issued on Jan. 17, 2012, in corresponding International Patent Application No. PCT/KR2011/003049 (5 pages).

(Continued)

*Primary Examiner* — Jared Fureman
*Assistant Examiner* — Aqeel Bukhari
(74) *Attorney, Agent, or Firm* — NSIP Law

(57) ABSTRACT

Provided are a method and apparatus for controlling a resonance bandwidth in a wireless power transmission system. The apparatus may include a source resonator to transfer an electromagnetic energy to a target resonator, and a source resonance bandwidth setting unit to set a resonance bandwidth of the source resonator.

17 Claims, 15 Drawing Sheets

(56) References Cited

U.S. PATENT DOCUMENTS

2010/0148723 A1\* 6/2010 Cook et al. .................. 320/108
2011/0140543 A1 6/2011 Ryu et al.

FOREIGN PATENT DOCUMENTS

| JP | 2010-51137 A | 3/2010 |
| KR | 10-2010-0012944 | 2/2010 |
| KR | 10-2010-0015954 | 2/2010 |

OTHER PUBLICATIONS

Written Opinion issued on Jan. 17, 2012, in corresponding International Patent Application No. PCT/KR2011/003049 (4 pages).

Chinese Office Action issued on Aug. 12, 2014 in counterpart Chinese Application No. 201180021435.9 (9 pages in English, 7 pages in Chinese).

Japanese Office Action issued on Feb. 10, 2015, in counterpart Japanese Application No. 2013-507883 (6 pages in English, 5 pages in Japanese).

\* cited by examiner

METHOD AND APPARATUS FOR CONTROLLING RESONANCE BANDWIDTH IN A WIRELESS POWER TRANSMISSION SYSTEM

CROSS-REFERENCE TO RELATED APPLICATION(S)

This application claims the benefit under 35 U.S.C. §119(a) of Korean Patent Application No. 10-2010-0039576, filed on Apr. 28, 2010, in the Korean Intellectual Property Office, the entire disclosure of which is incorporated herein by reference for all purposes.

BACKGROUND

1. Field

The following description relates to a wireless power transmission system, and more particularly, to a method and apparatus for controlling a resonance bandwidth between a source and a target in a wireless power transmission system in which a wireless power is transferred.

2. Description of Related Art

With the development of Information Technology (IT), a variety of portable electronic devices have been released and distribution of the portable electronic devices has also increased. Due to characteristics of the portable electronic devices, battery performance of a corresponding portable electronic device is becoming an issue. In addition to the portable electronic devices, home electronic appliances have a function of wirelessly transmitting data and can be supplied with power over a power line.

Currently, research has been conducted on wireless power transmission technologies that may wirelessly supply a power. Wireless energy transfer or wireless power is the transmission of electrical energy from a power source to an electrical load without interconnecting wires. Due to characteristics of a wireless environment, a distance between a source resonator and a target resonator may be highly likely to vary over time, and matching requirements to match the source resonator and the target resonator may also be changed.

Accordingly, there is a desire for a new method to improve a wireless transmission efficiency even when both the distance and the matching requirements are changed.

SUMMARY

In one general aspect, there is provided an apparatus for controlling a resonance bandwidth in a wireless power transmission system, the apparatus comprising: a source resonator configured to transfer an electromagnetic energy to a target resonator; and a source resonance bandwidth setting unit configured to set a resonance bandwidth of the source resonator, wherein the resonance bandwidth of the source resonator is set to be wider or narrower than a resonance bandwidth of the target resonator.

In the apparatus: the source resonance bandwidth setting unit may be further configured to set the resonance bandwidth of the source resonator to be a value obtained by subtracting a first frequency from a second frequency based on a central frequency; and the value of subtracting the first frequency from the second frequency may be less than 1/1.1 times the resonance bandwidth of the target resonator.

In the apparatus: the source resonance bandwidth setting unit may be further configured to set the resonance bandwidth of the source resonator to be a value obtained by subtracting a third frequency from a fourth frequency based on a central frequency; and the value of subtracting the third frequency from the fourth frequency may be greater than 1.1 times the resonance bandwidth of the target resonator.

The apparatus may further comprise a source controller configured to: verify a demand power of a target device; control the source resonance bandwidth setting unit to set a Q-factor of the source resonator to be within a first range in response to the demand power of the target device being less than a setting value; and control the source resonance bandwidth setting unit to set the Q-factor of the source resonator to be within a second range in response to the demand power of the target device being equal to or greater than the setting value.

In the apparatus: the first range may comprise values less than 100; and the second range may comprise values from 100 to 3000.

In another general aspect there is provided an apparatus for controlling a resonance bandwidth in a wireless power transmission system, the apparatus comprising: a target resonator configured to receive an electromagnetic energy from a source resonator; and a target resonance bandwidth setting unit configured to set a resonance bandwidth of the target resonator, wherein the resonance bandwidth of the target resonator is set to be wider or narrower than a resonance bandwidth of the source resonator.

In the apparatus: the target resonance bandwidth setting unit may be further configured to set the resonance bandwidth of the target resonator to be a value obtained by subtracting a first frequency from a second frequency based on a central frequency; and the value of subtracting the first frequency from the second frequency may be less than 1/1.1 times the resonance bandwidth of the source resonator.

In the apparatus: the target resonance bandwidth setting unit may be further configured to set the resonance bandwidth of the target resonator to be a value obtained by subtracting a third frequency from a fourth frequency based on a central frequency; and the value of subtracting the third frequency from the fourth frequency may be greater than 1.1 times the resonance bandwidth of the source resonator.

The apparatus may further comprise a communication unit configured to: receive information regarding the resonance bandwidth of the source resonator; provide the received information to the target resonance bandwidth setting unit; and transmit, to a source device, information regarding the resonance bandwidth of the target resonator, wherein the target resonance bandwidth setting unit is further configured to set the resonance bandwidth of the target resonator, based on the information regarding the resonance bandwidth of the source resonator.

In another general aspect there is provided an apparatus for controlling a resonance bandwidth in a wireless power transmission system, the apparatus comprising: a source resonator configured to transfer an electromagnetic energy to a target resonator; a source matching frequency setting unit configured to set an impedance matching frequency of the source resonator; and a target matching frequency setting unit configured to set an impedance matching frequency of the target resonator, wherein a bandwidth of the impedance matching frequency of the source resonator is set to be wider or narrower than a bandwidth of the impedance matching frequency of the target resonator.

In the apparatus: the source matching frequency setting unit may be further configured to set the bandwidth of the impedance matching frequency of the source resonator to be a value obtained by subtracting a first frequency from a second frequency based on a central frequency; and the value of subtracting the first frequency from the second frequency may be greater than twice the bandwidth of the impedance matching frequency of the target resonator.

In the apparatus: the source matching frequency setting unit may be further configured to set the bandwidth of the impedance matching frequency of the source resonator to be a value obtained by subtracting a first frequency from a second frequency based on a central frequency; and the value of subtracting the first frequency from the second frequency may be greater than ½ times the bandwidth of the impedance matching frequency of the target resonator.

In another general aspect, there is provided a method of controlling a resonance bandwidth in a wireless power transmission system, the method comprising: setting a resonance bandwidth of a source resonator and a resonance bandwidth of a target resonator; and transferring an electromagnetic energy from the source resonator to the target resonator through a magnetic coupling between the source resonator and the target resonator, wherein the resonance bandwidth of the source resonator is set to be wider or narrower than the resonance bandwidth of the target resonator.

In the method: the resonance bandwidth of the source resonator may be set to be a value obtained by subtracting a first frequency from a second frequency based on a central frequency; and the value of subtracting the first frequency from the second frequency is greater than twice the resonance bandwidth of the target resonator.

In the method: the resonance bandwidth of the source resonator may be set to be a value obtained by subtracting a first frequency from a second frequency based on a central frequency; and the value of subtracting the first frequency from the second frequency may be greater than ½ times the resonance bandwidth of the target resonator.

In the method, the setting may comprise: verifying a demand power of a target device; setting the resonance bandwidth of the source resonator such that a Q-factor of the source resonator is within a first range in response to the demand power of the target device being less than a setting value; and setting the resonance bandwidth of the source resonator such that the Q-factor of the source resonator is within a second range in response to the demand power of the target device being equal to or greater than the setting value.

In the method: the first range may comprise values less than 100; and the second range may comprises values from 100 to 3000.

In the method, the setting may comprise: sharing information regarding the resonance bandwidth of the source resonator and information regarding the resonance bandwidth of the target resonator between a source device and a target device, according to a communication scheme; and setting the resonance bandwidth of the source resonator and the resonance bandwidth of the target resonator, based on the information regarding the resonance bandwidth of the source resonator and the information regarding the resonance bandwidth of the target resonator.

In another general aspect, there is provided a resonance device for a wireless power transmission system, the resonance device comprising: a transmission line comprising: a first signal conducting portion; a second signal conducting portion; and a ground conducting portion; a capacitor configured to be inserted in a predetermined location of the transmission line; first and second conductors respectively electrically connected to the a first and second signal conducting portions; and a matcher electrically connected to the ground conducting portion, the matcher comprising a third conductor, wherein a resonance bandwidth of the source resonator is set to be a value obtained by subtracting a first frequency from a second frequency based on a central frequency.

The resonance device may further comprise a connector configured to receive or transmit a current.

Other features and aspects may be apparent from the following detailed description, the drawings, and the claims.

Figure 1:
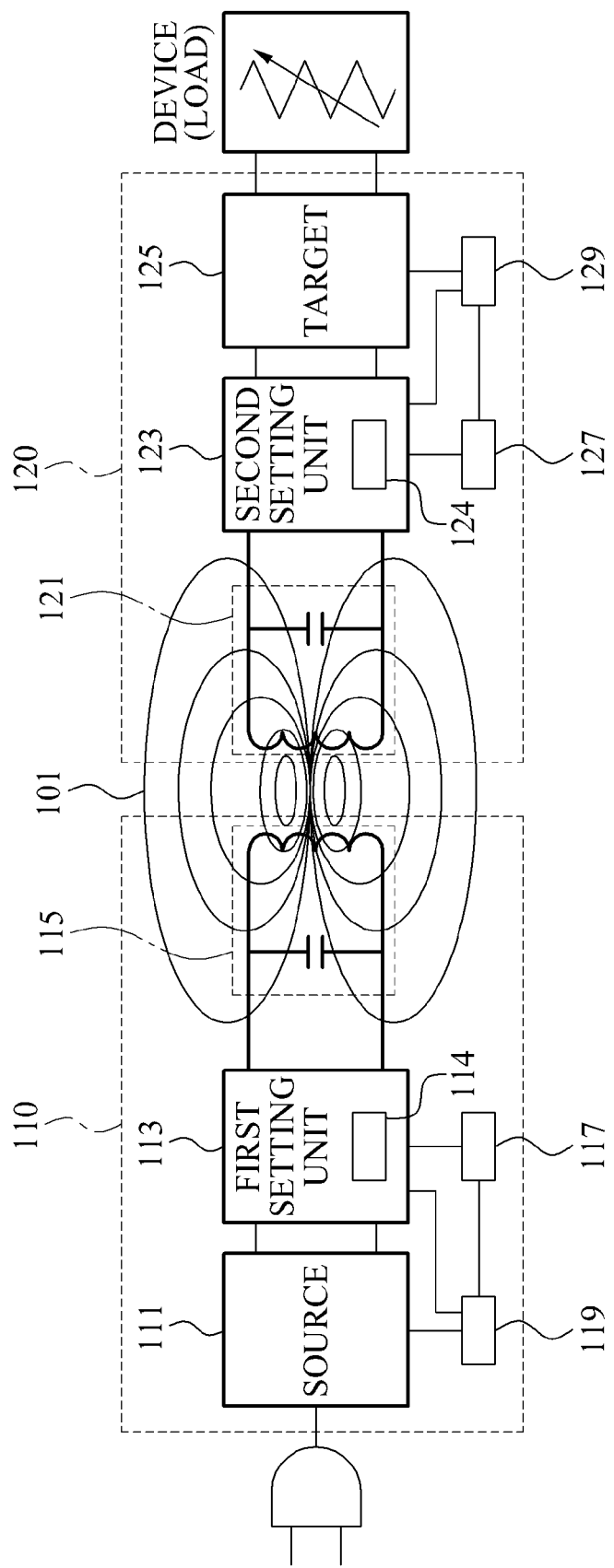
FIG. 1 is a diagram illustrating an example of a wireless power transmission system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

<Source-Target Structure>

FIG. 1 illustrates an example of a wireless power transmission system.

Referring to FIG. 1, the wireless power transmission system may have a source-target structure including a source device 110 and a target device 120. The wireless power transmission system may include an apparatus for controlling a resonance bandwidth. The apparatus for controlling a resonance bandwidth may be included in the source device 110 and the target device 120.

The source device 110 may generate a resonance power, and may transfer the generated resonance power to the target device 120. The source device 110 may include a source unit 111, a first setting unit 113, and a source resonator 115.

The target device 120 may include a target resonator 121, a second setting unit 123, and a target unit 125.

The source unit 111 may receive an energy from an external voltage supplier, e.g., a wall outlet, and may generate a resonance power. The source unit 111 may include, e.g., an alternating current (AC)-to-AC (AC/AC) converter, an AC-to-direct current (DC) (AC/DC) converter, and a DC-to-AC (DC/AC) inverter. The AC/AC converter may adjust, to a desired level, a signal level of an AC signal input from an external device. The AC/DC converter may output a DC voltage at a constant level by rectifying an AC signal output from the AC/AC converter. The DC/AC inverter may generate an AC signal in a band of a few megahertz (MHz) to tens of MHz by appropriately switching a DC voltage output from the AC/DC converter.

The first setting unit 113 may set at least one of a resonance bandwidth of the source resonator 115 and an impedance matching frequency of the source resonator 115. The first setting unit 113 may include a source setting unit 114, which may include at least one of a source resonance bandwidth setting unit and a source matching frequency setting unit. The source resonance bandwidth setting unit may set the resonance bandwidth of the source resonator 115. The source matching frequency setting unit may set the impedance matching frequency of the source resonator 115. For example, a Q-factor of the source resonator 115 may be determined based on setting of the resonance bandwidth of the source resonator 115 or setting of the impedance matching frequency of the source resonator 115.

The source resonator 115 may transfer electromagnetic energy to the target resonator 121. For example, the source resonator 115 may transfer the resonance power to the target device 120 through magnetic coupling 101 with the target resonator 121. The source resonator 115 may resonate within the set resonance bandwidth.

The target resonator 121 may receive the electromagnetic energy from the source resonator 115. The target resonator 121 may resonate within the set resonance bandwidth.

The second setting unit 123 may set at least one of a resonance bandwidth of the target resonator 121 and an impedance matching frequency of the target resonator 121. The second setting unit 123 may include a target setting unit 124, which may include at least one of a target resonance bandwidth setting unit and a target matching frequency setting unit. The target resonance bandwidth setting unit may set the resonance bandwidth of the target resonator 121. The target matching frequency setting unit may set the impedance matching frequency of the target resonator 121. For example, a Q-factor of the target resonator 121 may be determined based on setting of the resonance bandwidth of the target resonator 121 or setting of the impedance matching frequency of the target resonator 121.

The target unit 125 may transfer the received resonance power to a load. The target unit 125 may include an AC/DC converter and a DC/DC converter. The AC/DC converter may generate a DC signal by rectifying an AC signal transmitted from the source resonator 115 to the target resonator 121. The DC/DC converter may supply a rated voltage to the load by adjusting a signal level of the DC signal.

The source resonator 115 and the target resonator 121 may be configured, e.g., in a helix coil structured resonator, a spiral coil structured resonator, a meta-structured resonator, and the like.

Referring to FIG. 1, a process of controlling the Q-factor may include setting the resonance bandwidth of the source resonator 115 and the resonance bandwidth of the target resonator 121, and transferring the electromagnetic energy from the source resonator 115 to the target resonator 121 through the magnetic coupling 101 between the source resonator 115 and the target resonator 121. The resonance bandwidth of the source resonator 115 may be set to be wider or narrower than the resonance bandwidth of the target resonator 121.

<Sharing of Setting Information Via Communication>

Setting information of the resonance bandwidth may be shared by the first setting unit 113 and the second setting unit 123 according to a communication scheme, or may include, for example, a value set in advance. Accordingly, the first setting unit 113 and the second setting unit 123 may respectively set the resonance bandwidth of the source resonator 115, and the resonance bandwidth of the target resonator 121, based on information regarding the resonance bandwidth of the source resonator 115 and information regarding the resonance bandwidth of the target resonator 121.

According to an aspect, the source device 110 may further include a first communication unit 117, and a source controller 119. The first communication unit 117 may perform a communication with the target device 120. The source controller 119 may control an overall operation of the source device 110.

The first communication unit 117 may receive, from the target device 120, information regarding an amount of power demanded by the target device 120, and may transfer the received information to the source controller. Additionally, the first communication unit 117 may transmit, to the target device 120, information regarding the resonance bandwidth of the source resonator 115, or information regarding the impedance matching frequency of the source resonator 115. The first communication unit 117 may also receive information regarding the resonance bandwidth of the target resonator 121, or information regarding the impedance matching frequency of the target resonator 121, and may provide the first setting unit 113 with the received information. For example, the first setting unit 113 may set the resonance bandwidth of the source resonator 115 or the impedance matching frequency of the source resonator 115, based on the information provided by the first communication unit 117.

The source controller 119 may verify the power demanded by the target device 120, based on the information regarding the amount of power demanded by the target device 120, and may compare the power demanded by the target device 120 with a setting value. For example, the setting value may be, for example, 10 W, but there is no limitation thereto. As a result of the comparing, in response to the power demanded by the target device 120 being less than the setting value, the source controller 119 may control the source resonance bandwidth setting unit to set the Q-factor of the source resonator 115 to be within a first range. In response to the power demanded by the target device 120 being equal to or greater than the setting value, the source controller 119 may control the source resonance bandwidth setting unit to set the Q-factor of the source resonator 115 to be within a second range. The first range may include, for example, values less than 100, and the second range include, for example, values between 100 and 3000. For example, in response to a high power being required by the target device 120, a Q-factor $Q_S$ of the source resonator 115 may be set to be a value greater than 100. In response to a low power being required by the target device 120, the Q-factor $Q_S$ of the source resonator 115 may be set to be a value less than 100.

Additionally, according to an aspect, the target device 120 may further include a second communication unit 127, and a target controller 129. The second communication unit 127 may perform a communication with the source device 110. The target controller 129 may control an overall operation of the target device 120.

The second communication unit 127 may receive the information regarding the resonance bandwidth of the source resonator 115, may provide the received information to the target resonance bandwidth setting unit, and may transmit the information regarding the resonance bandwidth of the target resonator 121 to the source device 110. The target resonance bandwidth setting unit may set the resonance bandwidth of the target resonator 121 based on the information regarding the resonance bandwidth of the source resonator 115.

The target controller 129 may calculate an amount of power required by the load, or a power amount set in advance, and may transmit the calculated amount to the source device 110 via the second communication unit 127.

<Unbalance Bandwidth (BW)-Factor Matching>

As a level of a performance of the wireless power transmission system, a resonance bandwidth, a wireless power transmission efficiency, and a Q-factor may be used. The resonance bandwidth, the wireless power transmission efficiency, and the Q-factor may have correlation with each other. To achieve an optimal wireless power transmission, a trade-off between the resonance bandwidth, the wireless power transmission efficiency, and the Q-factor may need to be in considered. The source-target structure of FIG. 1 may be used to perform a wireless power transmission employing a resonance scheme. In the wireless power transmission employing the resonance scheme, a power may be transmitted in a constant resonance frequency band. Accordingly, a resonance frequency band and a resonance bandwidth may be required to stably transmit a resonance power.

In the wireless power transmission employing the resonance scheme, the resonance bandwidth may be an important factor. In response to the Q-factor being Qt, considering all of a change in a distance between the source resonator 115 and the target resonator 121, a change in the resonance impedance, impedance mismatching, a reflected signal, and the like, Qt may have an inverse-proportional relationship with the resonance bandwidth, as given by Equation 1.

$$\frac{\Delta f}{f_0} = \frac{1}{Qt}$$

$$= \Gamma_{S,D} + \frac{1}{BW_S} + \frac{1}{BW_D}$$

[Equation 1]

In Equation 1, $f_0$ denotes a central frequency, $\Delta f$ denotes a change in a bandwidth, $\Gamma_{S,D}$ denotes a reflection loss between the source resonator 115 and the target resonator 121, $BW_S$ denotes the resonance bandwidth of the source resonator 115, and $BW_D$ denotes the resonance bandwidth of the target resonator 121. As an example, the BW-factor may indicate either $1/BW_S$ or $1/BW_D$.

Additionally, in the wireless power transmission, a wireless power transmission efficiency U may be defined as given by Equation 2.

$$U = \frac{\kappa}{\sqrt{\Gamma_S \Gamma_D}} = \frac{\omega_0 M}{\sqrt{R_S R_D}} = \frac{\sqrt{Q_S Q_D}}{Q_K}$$

[Equation 2]

In Equation 2, K denotes a coupling coefficient of energy coupling between the source resonator 115 and the target resonator 121, $\Gamma_S$ denotes a reflection coefficient in the source resonator 115, $\Gamma_D$ denotes a reflection coefficient in the target resonator 121, $\omega_0$ denotes the resonance frequency, M denotes a mutual inductance between the source resonator 115 and the target resonator 121, $R_S$ denotes an impedance of the source resonator 115, $R_D$ denotes an impedance of the target resonator 121, $Q_S$ denotes the Q-factor of the source resonator 115, $Q_D$ denotes a Q-factor of the target resonator 121, and $Q_K$ denotes a Q-factor for the energy coupling between the source resonator 115 and the target resonator 121.

Referring to Equation 1, the Q-factors may have a high relevance to the wireless power transmission efficiency. For example, to increase the wireless power transmission efficiency, values of the Q-factors may be set to be high. When values of $Q_S$ and $Q_D$ are set to be excessively high, the wireless power transmission efficiency may be reduced due to a change in the coupling coefficient K, the change in the distance between the source resonator 115 and the target resonator 121, the change in the resonance impedance, the impedance mismatching, and the like.

Additionally, when the resonance bandwidth of the source resonator 115 and the resonance bandwidth of the target resonator 121 are set to be excessively narrow, e.g., to increase the wireless power transmission efficiency, impedance mismatching and the like, may easily occur, despite a small effect arising from the outside. Considering the impedance mismatching, Equation 1 may be represented as given by Equation 3.

$$\frac{\Delta f}{f_0} = \frac{\sqrt{VSWR} - 1}{Qt\sqrt{VSWR}}$$

[Equation 3]

The method and apparatus for controlling a resonance bandwidth according to embodiments may maintain an unbalanced relationship in a resonance bandwidth or in a bandwidth of an impedance matching frequency between the source resonator 115 and the target resonator 121, and may prevent the wireless power transmission efficiency from being reduced due to the change in the coupling coefficient K, the change in the distance between the source resonator 115 and the target resonator 121, the change in the resonance impedance, the impedance mismatching, and the like. As shown in Equations 1 and 3, when the unbalanced relationship in the resonance bandwidth or in the bandwidth of the impedance matching frequency between the source resonator 115 and the target resonator 121 is maintained, an unbalanced relationship between the Q-factor of the source resonator 115 and the Q-factor of the target resonator 121 may also be maintained.

Figure 2:
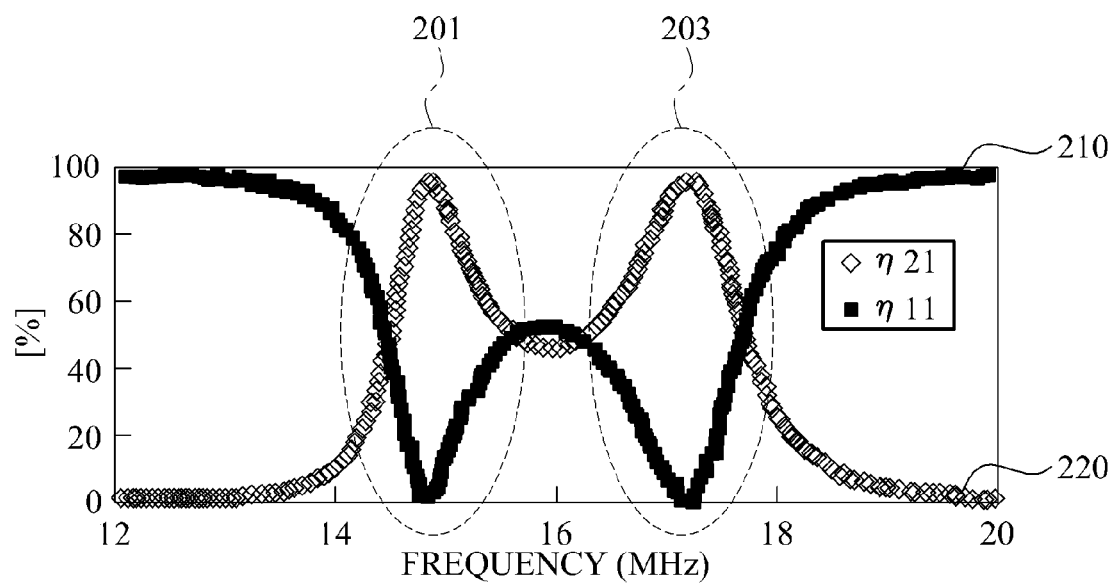
FIG. 2 is a diagram illustrating an example of a wireless power transmission efficiency measured in a wireless power transmission system.

FIG. 2 illustrates an example of a wireless power transmission efficiency measured in the wireless power transmission system.

In FIG. 2, a black square of a curve 210 indicates a ratio η11 of a wireless power transmitted by the source resonator 115 to a wireless power received by the target resonator 121. Additionally, an empty square of a curve 220 indicates a ratio η21 of the wireless power transmitted by the source resonator 115 to a reflected power. For example, presuming that a value of $1/BW_S$ is set to be equal to a value of $1/BW_D$, and values of $Q_S$ and $Q_D$ are greater than 100, a wireless power transmission efficiency is not constant. For example, the wireless power transmission efficiency may be high at dotted circles 201 and 203, and the wireless power transmission efficiency may be lowered in the vicinity of a frequency of 16 MHz. In other words, when the value of $1/BW_S$ is set to be equal to the value of $1/BW_D$, and when $Q_S$ and $Q_D$ have high values, the wireless power transmission efficiency may be reduced due to the change in the distance between the source resonator 115 and the target resonator 121, the change in the resonance impedance, and the like.

To maintain a constant wireless power transmission efficiency, the first setting unit 113 and the second setting unit 123 may perform "unbalance BW-factor matching". For example, the "unbalance BW-factor matching" may enable maintaining of an unbalanced relationship between a BW-factor of the source resonator 115 and a BW-factor of the target resonator 121. For example, the first setting unit 113 may perform "unbalance BW-factor matching" by setting the resonance bandwidth of the source resonator 115 to be wider or narrower than the resonance bandwidth of the target resonator 121. The first setting unit 113 may also perform "unbalance BW-factor matching" by setting the bandwidth of impedance matching frequency of the source resonator 115 to be wider or narrower than the bandwidth of impedance matching frequency of the target resonator 121. Similarly, the second setting unit 123 may perform "unbalance BW-factor matching" by setting the resonance bandwidth of the target resonator 121 to be wider or narrower than the resonance bandwidth of the source resonator 115.

Examples of the "unbalance BW-factor matching" will be further described with reference to FIG. 3.

Figure 3:
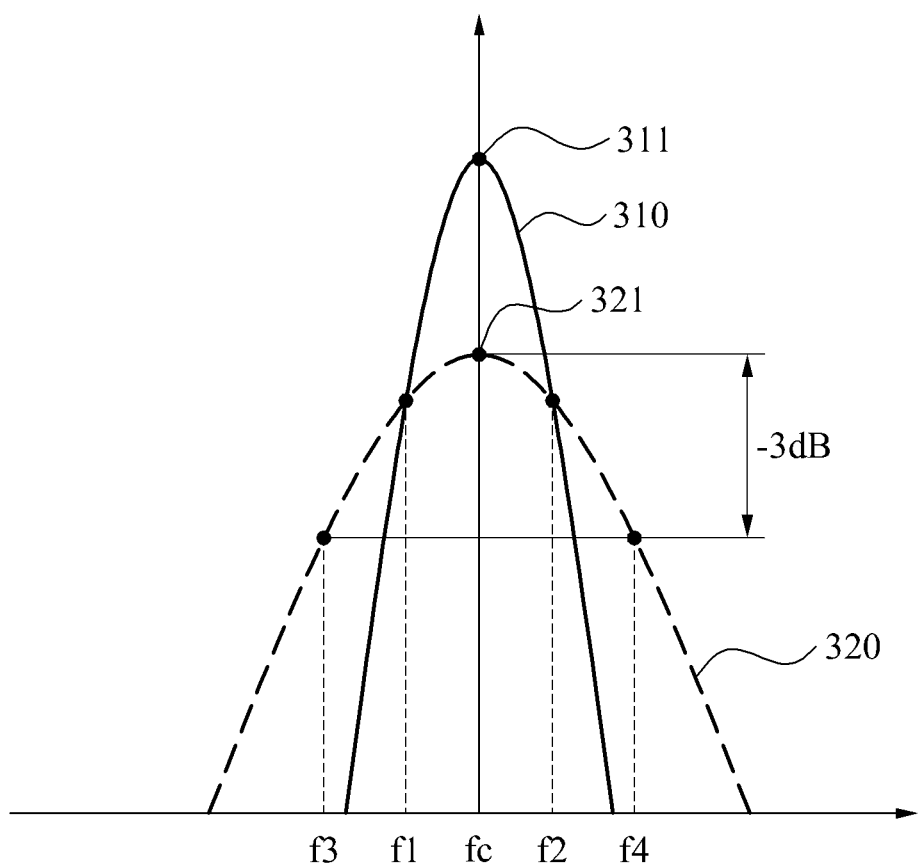
FIG. 3 is a diagram illustrating an example of unbalance bandwidth (BW)-factor matching.

FIG. 3 illustrates an example of unbalance BW-factor matching.

In FIG. 3, a solid curve 310 and a dotted curve 320 may indicate a frequency characteristic of the source resonator 115, or a frequency characteristic of the target resonator 121. When the source resonator 115 has a frequency characteristic represented by the solid curve 310, the target resonator 121 may have a frequency characteristic represented by the dotted curve 320. Additionally, when the source resonator 115 has the frequency characteristic represented by the dotted curve 320, the target resonator 121 may have the frequency characteristic represented by the solid curve 310. The curves 310 and 320 of FIG. 3 may have a band-pass characteristic. For example, $1/BW_S$ and $1/BW_D$ may be respectively defined as given by Equations 4 and 5 below.

$$1/BW_S = 1/(f2-f1); \text{ and}$$

$$1/BW_D = 1/(f4-f3) \quad \text{[Equation 4]}$$

Referring to Equation 4 and FIG. 3, fc denotes a central frequency of the resonance bandwidth of the source resonator 115. Additionally, f1 and f2 may denote two frequencies having an amplitude 311, e.g., of −3 decibel (dB) to −10 dB at the central frequency fc; and f3 and f4 may denote two frequencies having an amplitude 321, e.g., of −3 dB to −10 dB at the central frequency fc. In Equation 4, the resonance bandwidth of the source resonator 115 may be set to be a value obtained by subtracting the first frequency f1 from the second frequency f2, and the resonance bandwidth of the target resonator 121 may be set to be a value obtained by subtracting the third frequency f3 from the fourth frequency f4. The source device 110 and the target device 120 may perform communication within their respective resonance bandwidths. For example, a bandwidth used to perform the communication may be determined by two frequencies in the amplitude 311 of −3 dB at the central frequency fc, and the resonance bandwidths may be determined by two frequencies in the amplitude 311 of −10 dB at the central frequency fc. Accordingly, in the source-target structure, a bandwidth for a communication may be set to be wide, and a resonance bandwidth for transceiving a resonance power may be set to be narrow, efficiently performing the communication and increasing a power transmission efficiency.

$$1/BW_S = 1/(f4-f3), \text{ and}$$

$$1/BW_D = 1/(f2-f1) \quad \text{[Equation 5]}$$

In Equation 5, the resonance bandwidth of the source resonator 115 may be set to be a value obtained by subtracting the frequency f3 from the frequency f4, and the resonance bandwidth of the target resonator 121 may be set to be a value obtained by subtracting the frequency f1 from the frequency f2.

In FIG. 3, the value of subtracting the frequency f1 from the frequency f2 may be presumed to be less than 1/1.1 times the resonance bandwidth of the target resonator, and the value of subtracting the frequency f3 from the frequency f4 may be presumed to be greater than 1.1 times the value of subtracting the frequency f1 from the frequency f2. Accordingly, the first setting unit 113 may set the resonance bandwidth or the bandwidth of the impedance matching frequency of the source resonator 115 to be the value of subtracting the frequency f1 from the frequency f2 or the value of subtracting the frequency f3 from the frequency f4 based on the central frequency fc.

As described above, it may be possible to control the unbalanced relationship between $1/BW_S$ and $1/BW_D$, preventing the wireless power transmission efficiency from being reduced due to the change in the coupling coefficient K, the change in the distance between the source resonator 115 and the target resonator 121, the change in the resonance impedance, the impedance mismatching, and the like. In other words, it may be possible to stably transmit a resonance power through the unbalance BW-factor matching, even when a value of $Q_S$ or $Q_D$ is set to be high.

Figure 4:
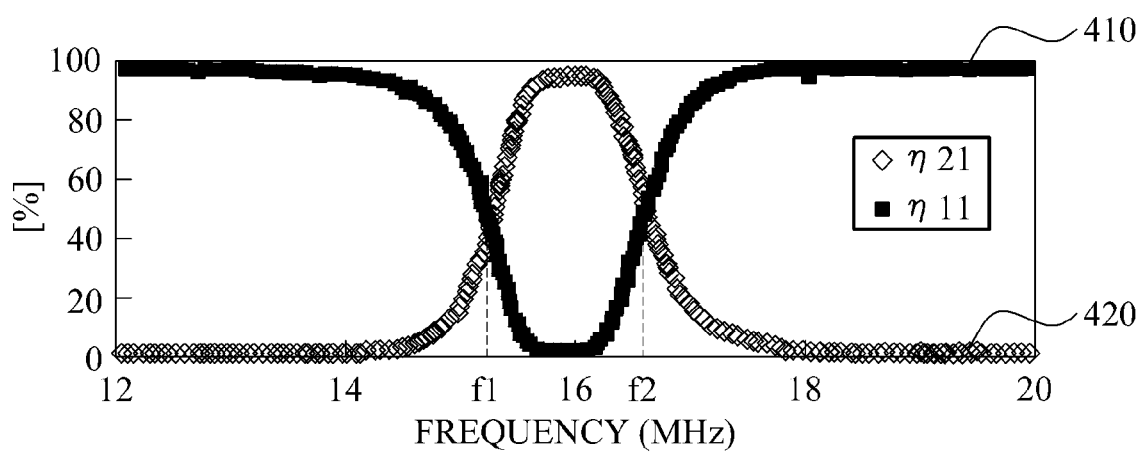
FIG. 4 is a diagram illustrating another example of a wireless power transmission efficiency measured in a wireless power transmission system.

FIG. 4 illustrates another example of a wireless power transmission efficiency measured in the wireless power transmission system.

For example, FIG. 4 illustrates a wireless power transmission efficiency in an example of an unbalanced relationship between $1/BW_S$ and $1/BW_D$. In one example, in FIG. 4, a black square of a curve 410 indicates a ratio η11 of a wireless power transmitted by the source resonator 115 to a wireless power received by the target resonator 121, and an empty square of a curve 420 indicates a ratio $η_{21}$ of the wireless power transmitted by the source resonator 115 to a reflected power. Accordingly, when the unbalanced relationship between $1/BW_S$ and $1/BW_D$ is maintained, a constant frequency between the frequencies f1 to f2 may also be maintained, as shown in FIG. 4.

Figure 5:
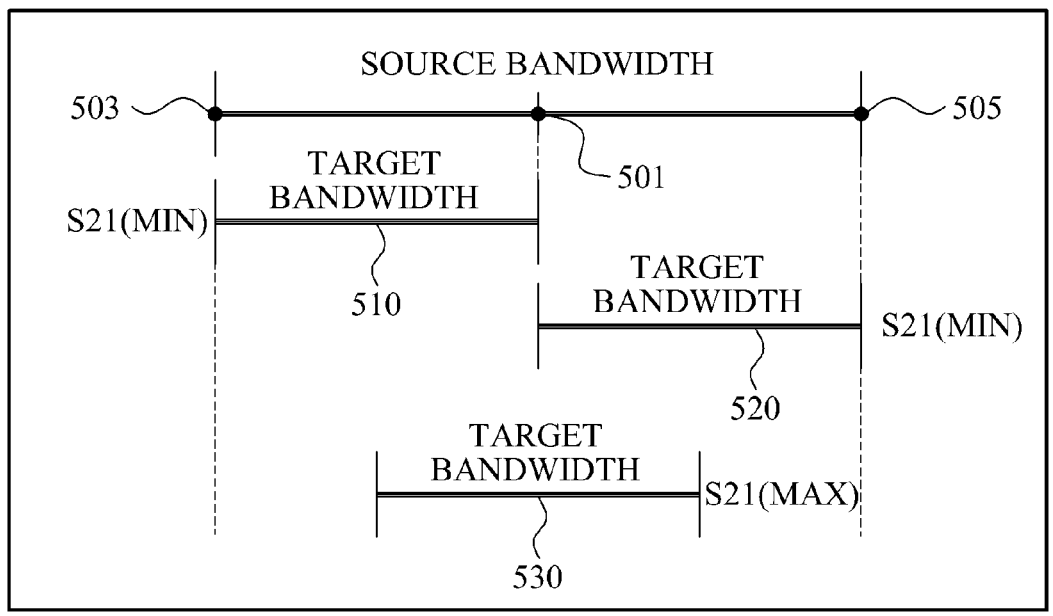
FIGS. 5 and 6 are diagrams illustrating examples of unbalance BW-factor matching in view of impedance matching.
Figure 6:
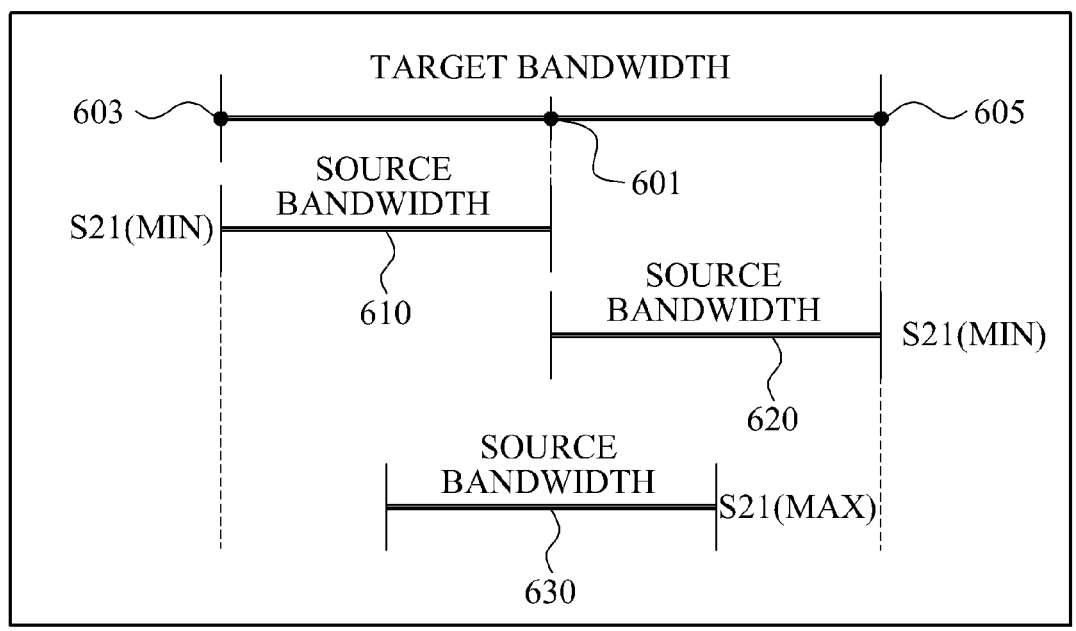

FIGS. 5 and 6 illustrate examples of unbalance BW-factor matching in view of impedance matching.

In the FIG. 5 example, a range from a point 503 to a point 505 indicates an impedance matching range of the source resonator 115, and a point 501 indicates a central value of the impedance matching range. When the impedance matching range of the source resonator 115 is set to be the range from the point 503 to the point 505, an impedance matching range of the target resonator 121 may be set to be less than ½ times the impedance matching range of the source resonator 115. Additionally, a target bandwidth 510 indicates that the impedance matching range of the target resonator 121 is lower than the point 501, and a target bandwidth 520 indicates that the impedance matching range of the target resonator 121 is higher than the point 501. When the impedance matching range of the target resonator 121 is set to be the target bandwidth 510 or target bandwidth 520, an S parameter S21 may have a minimum value. Furthermore, a target bandwidth 530 of FIG. 5 indicates that the impedance matching range of the target resonator 121 is set in the vicinity of the point 501. For example, when the impedance matching range of the target resonator 121 is set to be the target bandwidth 530, the S parameter S21 may have a maximum value. In other words, when the impedance matching range of the target resonator 121 is set to be the target bandwidth 530, the wireless power transmission efficiency may be maximized.

In FIG. 6, a range from a point 603 to a point 605 indicates an impedance matching range of the target resonator 121, and a point 601 indicates a central value of the impedance matching range. When the impedance matching range of the target resonator 121 is set to be the range from the point 603 to the point 605, an impedance matching range of the source resonator 115 may be set to be less than ½ times the impedance matching range of the target resonator 121. Additionally, a source bandwidth 610 indicates that the impedance matching range of the source resonator 115 is lower than the point 601, and a source bandwidth 620 indicates that the impedance matching range of the source resonator 115 is higher than the point 601. When the impedance matching range of the source resonator 115 is set to be the source bandwidth 610 or source bandwidth 620, an S parameter S21 may have a minimum value. Furthermore, a source bandwidth 630 of FIG. 6 indicates that the impedance matching range of the source resonator 115 is set in the vicinity of the point 601. For example, when the impedance matching range of the source resonator 115 is set to be the source bandwidth 630, the S parameter S21 may have a maximum value. In other words, when the impedance matching range of the source resonator 115 is set to be the source bandwidth 630, the wireless power transmission efficiency may be maximized.

A source resonator and/or a target resonator may be configured, e.g., as a helix coil structured resonator, a spiral coil structured resonator, a meta-structured resonator, and the like. Hereinafter, related terms will be described for concise understanding. All the materials may have a unique magnetic permeability, i.e., Mu ($\mu$) and a unique permittivity, i.e., epsilon ($\in$). The magnetic permeability indicates a ratio between a magnetic flux density occurring with respect to a given magnetic field in a corresponding material and a magnetic flux density occurring with respect to the given magnetic field in a vacuum state. The magnetic permeability and the permittivity may determine a propagation constant of a corresponding material in a given frequency or a given wavelength. An electromagnetic characteristic of the corresponding material may be determined based on the magnetic permeability and the permittivity. In particular, a material having a magnetic permeability or a permittivity absent in nature and being artificially designed is referred to as a metamaterial. The metamaterial may be easily disposed in a resonance state even in a relatively large wavelength area or a relatively low frequency area. For example, even though a material size rarely varies, the metamaterial may be easily disposed in the resonance state.

Figure 7:
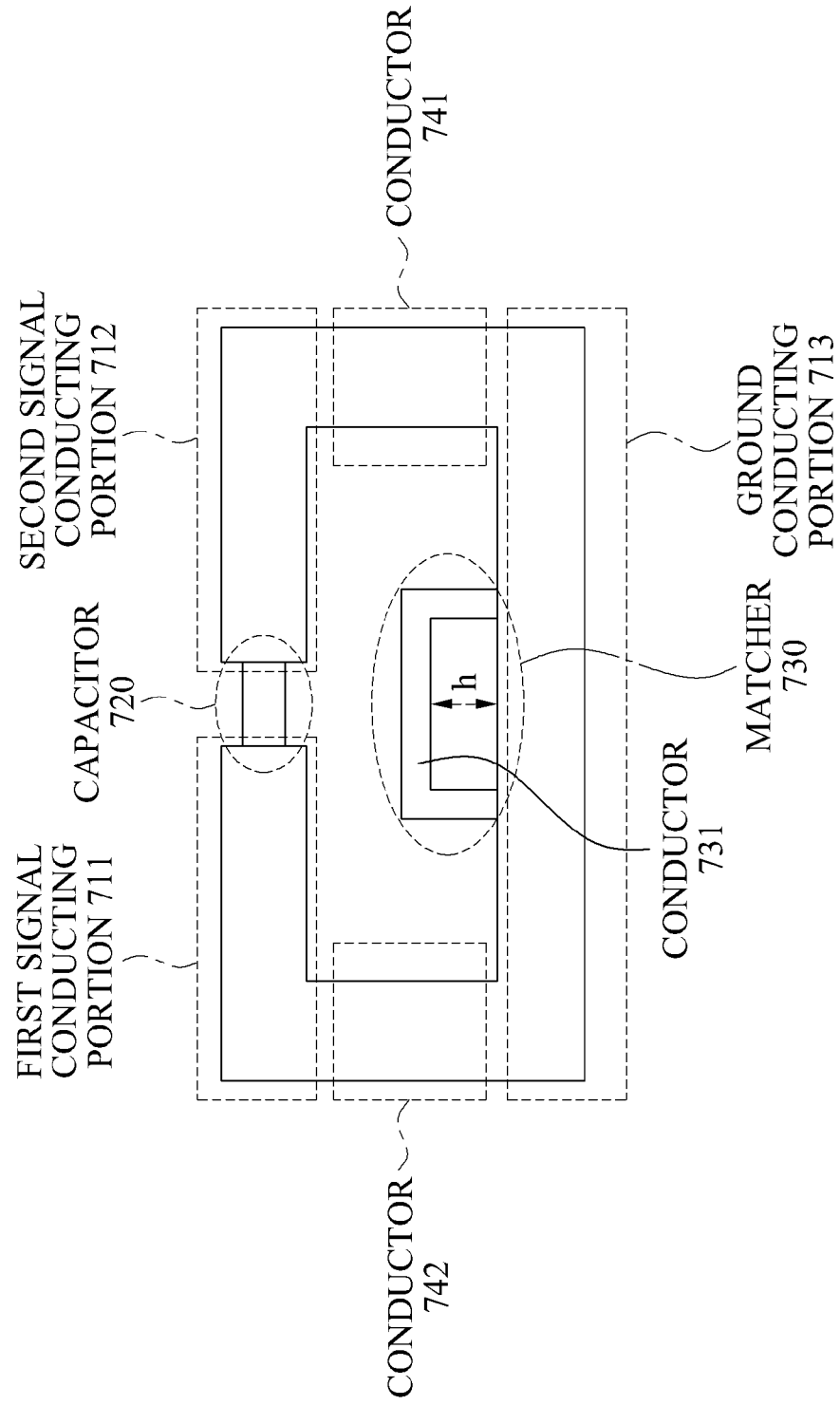
FIGS. 7 through 13B are diagrams illustrating various examples of a resonator structure.

FIG. 7 illustrates an example of a resonator 700 having a two-dimensional (2D) structure.

Referring to FIG. 7, the resonator 700 having the 2D structure may include a transmission line, a capacitor 720, a matcher 730, and conductors 741 and 742. The transmission line may include a first signal conducting portion 711, a second signal conducting portion 712, and a ground conducting portion 713.

The capacitor 720 may be inserted in series between the first signal conducting portion 711 and the second signal conducting portion 712, such that an electric field may be confined within the capacitor 720. In one example, the transmission line may include at least one conductor in an upper portion of the transmission line, and may also include at least one conductor in a lower portion of the transmission line. A current may flow through the at least one conductor disposed in the upper portion of the transmission line and the at least one conductor disposed in the lower portion of the transmission line may be electrically grounded. A conductor disposed in an upper portion of the transmission line may be separated into and may be referred to as the "first signal conducting portion" 711 and the "second signal conducting portion" 712. A conductor disposed in the lower portion of the transmission line may be referred to as the "ground conducting portion" 713.

As shown in FIG. 7, the resonator 700 may have the 2D structure. The transmission line may include the first signal conducting portion 711 and the second signal conducting portion 712 in the upper portion of the transmission line, and may include the ground conducting portion 713 in the lower portion of the transmission line. The first signal conducting portion 711 and the second signal conducting portion 712 may be disposed to face the ground conducting portion 713. The current may flow through the first signal conducting portion 711 and the second signal conducting portion 712.

One end of the first signal conducting portion 711 may be shorted (e.g., connected) to the conductor 742, and another end of the first signal conducting portion 711 may be connected to the capacitor 720. One end of the second signal conducting portion 712 may be grounded (e.g., connected) to the conductor 741, and another end of the second signal conducting portion 712 may be connected to the capacitor 720. Accordingly, the first signal conducting portion 711, the second signal conducting portion 712, the ground conducting portion 713, and the conductors 741 and 742 may be connected to each other, such that the resonator 700 may have an electrically closed-loop structure. The term "loop structure" may include a polygonal structure, for example, a circular structure, a rectangular structure, and the like. "Having a loop structure" may indicate being electrically closed.

The capacitor 720 may be inserted into an intermediate portion of the transmission line. For example, the capacitor 720 may be inserted into a space between the first signal conducting portion 711 and the second signal conducting portion 712. The capacitor 720 may have a shape, e.g., of a lumped element, a distributed element, and the like. As an example, a distributed capacitor having the shape of the distributed element may include zigzagged conductor lines and a dielectric material having a relatively high permittivity between the zigzagged conductor lines.

When the capacitor 720 is inserted into the transmission line, the resonator 700 may have a property of a metamaterial. As discussed above, the metamaterial indicates a material having a predetermined electrical property that cannot be discovered in nature and thus, may have an artificially designed structure. An electromagnetic characteristic of all the materials existing in nature may have a unique magnetic permeability or a unique permittivity. Most materials may have a positive magnetic permeability or a positive permittivity. In the case of most materials, a right hand rule may be applied to an electric field, a magnetic field, and a pointing vector and thus, the corresponding materials may be referred to as right handed materials (RHMs). However, a metamaterial has a magnetic permeability or a permittivity absent in nature and thus, may be classified into an epsilon negative (ENG) material, a mu negative (MNG) material, a double negative (DNG) material, a negative refractive index (NRI) material, a left-handed material (LHM), and the like, based on a sign of the corresponding permittivity or magnetic permeability.

When a capacitance of the capacitor inserted as the lumped element is appropriately determined, the resonator 700 may have the characteristic of the metamaterial. As the resonator 700 may have a negative magnetic permeability by appropriately adjusting the capacitance of the capacitor 720, the resonator 700 may also be referred to as an MNG resonator. Various criteria may be applied to determine the capacitance of the capacitor 720. For example, the various criteria may include a criterion for enabling the resonator 700 to have the characteristic of the metamaterial, a criterion for enabling the resonator 700 to have a negative magnetic permeability in a target frequency, a criterion for enabling the resonator 700 to have a zeroth order resonance characteristic in the target frequency, and the like. Based on at least one criterion among the aforementioned criteria, the capacitance of the capacitor 720 may be determined.

The resonator 700, also referred to as the MNG resonator 700, may have a zeroth order resonance characteristic of having, as a resonance frequency, a frequency when a propagation constant is "0". As the resonator 700 may have the zeroth order resonance characteristic, the resonance frequency may be independent with respect to a physical size of the MNG resonator 700. By appropriately designing the capacitor 720, the MNG resonator 700 may sufficiently change the resonance frequency. Accordingly, the physical size of the MNG resonator 700 may not be changed.

In a near field, the electric field may be concentrated on the capacitor 720 inserted into the transmission line. Accordingly, due to the capacitor 720, the magnetic field may become dominant in the near field. The MNG resonator 700 may have a relatively high Q-factor using the capacitor 720 of the lumped element. As such, it may be possible to enhance an efficiency of power transmission. For example, the Q-factor may indicate a level of an ohmic loss or a ratio of a reactance with respect to a resistance in the wireless power transmission. It may be understood that the efficiency of the wireless power transmission may increase according to an increase in the Q-factor.

The MNG resonator 700 may include the matcher 730 for impedance matching. The matcher 730 may appropriately adjust a strength of a magnetic field of the MNG resonator 700. An impedance of the MNG resonator 700 may be determined by the matcher 730. A current may flow in the MNG resonator 700 via a connector, or may flow out from the MNG resonator 700 via the connector. The connector may be connected to the ground conducting portion 713 or the matcher 730. The power may be transferred through coupling without using a physical connection between the connector and the ground conducting portion 713 or the matcher 730.

For example, as shown in FIG. 7, the matcher 730 may be positioned within the loop formed by the loop structure of the resonator 700. The matcher 730 may adjust the impedance of the resonator 700 by changing the physical shape of the matcher 730. For example, the matcher 730 may include a conductor 731 for the impedance matching in a location separate from the ground conducting portion 713 by a distance "h". The impedance of the resonator 700 may be changed by adjusting the distance "h".

Although not illustrated in FIG. 7, a controller may be provided to control the matcher 730. In one example, the matcher 730 may change the physical shape of the matcher 730 based on a control signal generated by the controller. For example, the distance "h" between the conductor 731 of the matcher 730 and the ground conducting portion 713 may increase or decrease based on the control signal. Accordingly, the physical shape of the matcher 730 may be changed such that the impedance of the resonator 700 may be adjusted. The controller may generate the control signal based on various factors, which will be described later.

As shown in FIG. 7, the matcher 730 may be configured as a passive element such as the conductor 731. Depending on embodiments, the matcher 730 may be configured as an active element such as a diode, a transistor, and the like. When the active element is included in the matcher 730, the active element may be driven based on the control signal generated by the controller, and the impedance of the resonator 700 may be adjusted based on the control signal. For example, a diode that is a type of the active element may be included in the matcher 730. The impedance of the resonator 700 may be adjusted depending on whether the diode is in an on-state or in an off-state.

Although not illustrated in FIG. 7, a magnetic core may be further provided to pass through the MNG resonator 700. The magnetic core may perform a function of increasing a power transmission distance.

Figure 8:
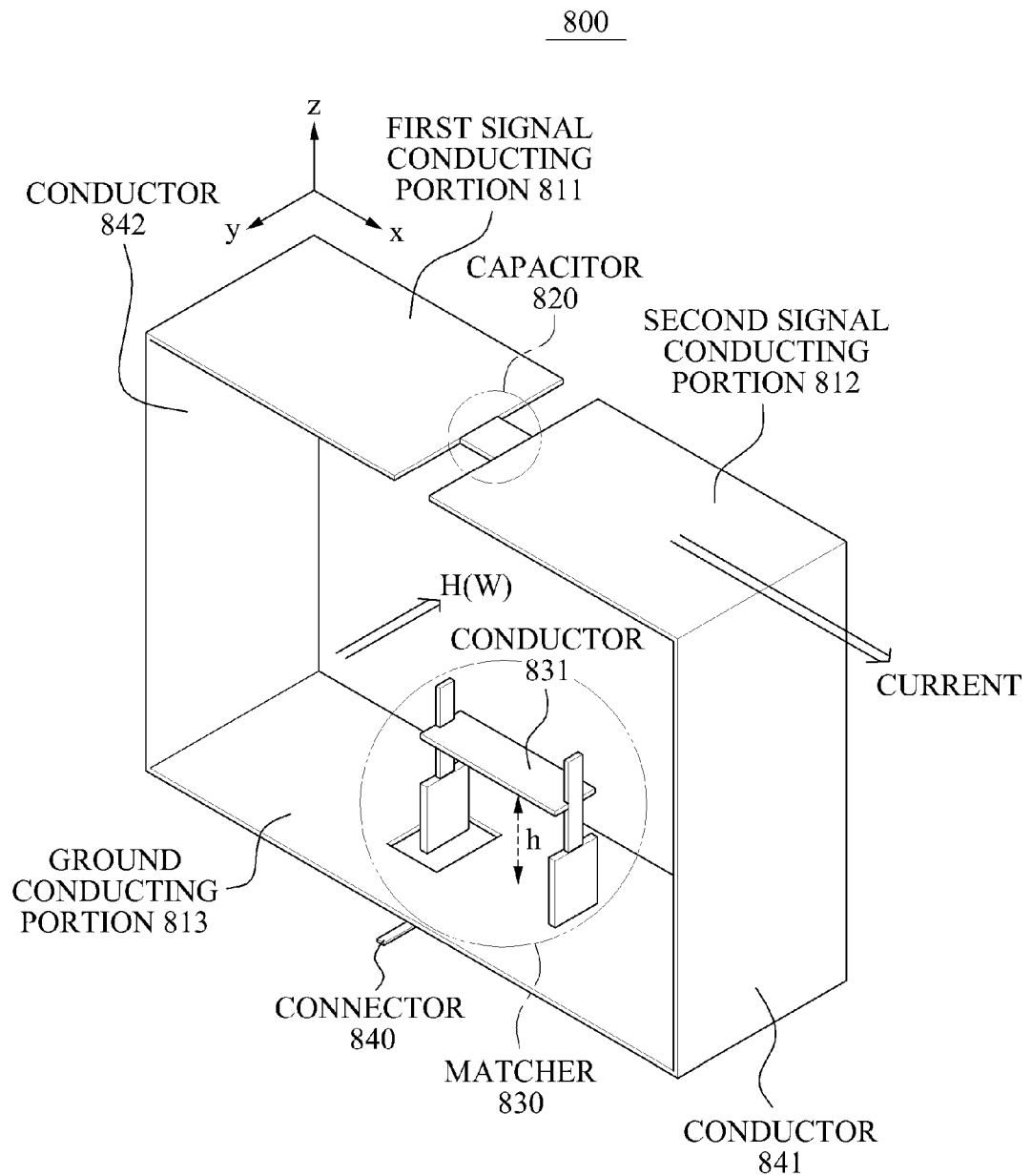

FIG. 8 illustrates an example of a resonator 800 having a three-dimensional (3D) structure.

Referring to FIG. 8, the resonator 800 having the 3D structure may include a transmission line and a capacitor 820. The transmission line may include a first signal conducting portion 811, a second signal conducting portion 812, and a ground conducting portion 813. The capacitor 820 may be inserted in series between the first signal conducting portion 811 and the second signal conducting portion 812 of the transmission link, such that an electric field may be confined within the capacitor 820.

As shown in FIG. 8, the resonator 800 may have the 3D structure. The transmission line may include the first signal conducting portion 811 and the second signal conducting portion 812 in an upper portion of the resonator 800, and may include the ground conducting portion 813 in a lower portion of the resonator 800. The first signal conducting portion 811 and the second signal conducting portion 812 may be disposed to face the ground conducting portion 813. A current may flow in an "x" direction through the first signal conducting portion 811 and the second signal conducting portion 812. Due to the current, a magnetic field H(W) may be formed in a −y direction. Alternatively, unlike the diagram of FIG. 8, the magnetic field H(W) may be formed in a +y direction.

One end of the first signal conducting portion 811 may be shorted (e.g., connected) to the conductor 842, and another end of the first signal conducting portion 811 may be connected to the capacitor 820. One end of the second signal conducting portion 812 may be grounded (e.g., connected) to the conductor 841, and another end of the second signal conducting portion 812 may be connected to the capacitor 820. Accordingly, the first signal conducting portion 811, the second signal conducting portion 812, the ground conducting portion 813, and the conductors 841 and 842 may be connected to each other, such that the resonator 800 may have an electrically closed-loop structure. The term "loop structure" may include a polygonal structure, for example, a circular structure, a rectangular structure, and the like. "Having a loop structure" may indicate being electrically closed.

As shown in FIG. 8, the capacitor 820 may be inserted between the first signal conducting portion 811 and the second signal conducting portion 812. The capacitor 820 may be inserted into a space between the first signal conducting portion 811 and the second signal conducting portion 812. The capacitor 820 may have a shape, for example, of a lumped element, a distributed element, and the like. As an example, a distributed capacitor having the shape of the distributed element may include zigzagged conductor lines and a dielectric material having a relatively high permittivity between the zigzagged conductor lines.

As the capacitor 820 is inserted into the transmission line, the resonator 800 may have a property of a metamaterial.

When a capacitance of the capacitor inserted as the lumped element is appropriately determined, the resonator 800 may have a characteristic of a metamaterial. As the resonator 800 may have a negative magnetic permeability by appropriately adjusting the capacitance of the capacitor 820, the resonator 800 may also be referred to as an MNG resonator. Various criteria may be applied to determine the capacitance of the capacitor 820. For example, the various criteria may include a criterion for enabling the resonator 800 to have the characteristic of the metamaterial, a criterion for enabling the resonator 800 to have a negative magnetic permeability in a target frequency, a criterion enabling the resonator 800 to have a zeroth order resonance characteristic in the target frequency, and the like. Based on at least one criterion among the aforementioned criteria, the capacitance of the capacitor 820 may be determined.

The resonator 800, also referred to as the MNG resonator 800, may have a zeroth order resonance characteristic of having, as a resonance frequency, a frequency when a propagation constant is "0". As the resonator 800 may have the zeroth order resonance characteristic, the resonance frequency may be independent with respect to a physical size of the MNG resonator 800. By appropriately designing the capacitor 820, the MNG resonator 800 may sufficiently change the resonance frequency. Accordingly, the physical size of the MNG resonator 800 may not be changed.

Referring to the MNG resonator 800 of FIG. 8, in a near field, the electric field may be concentrated on the capacitor 820 inserted into the transmission line. Accordingly, due to the capacitor 820, the magnetic field may become dominant in the near field. For example, as the MNG resonator 800 having the zeroth-order resonance characteristic may have characteristics similar to a magnetic dipole, the magnetic field may become dominant in the near field. A relatively small amount of the electric field formed due to the insertion of the capacitor 820 may be concentrated on the capacitor 820, the magnetic field may become further dominant.

Also, the MNG resonator 800 may include the matcher 830 for impedance matching. The matcher 830 may appropriately adjust the strength of magnetic field of the MNG resonator 800. An impedance of the MNG resonator 800 may be determined by the matcher 830. A current may flow in the MNG resonator 800 via a connector 840, or may flow out from the MNG resonator 800 via the connector 840. The connector 840 may be connected to the ground conducting portion 813 or the matcher 830.

In the example shown in FIG. 8, the matcher 830 may be positioned within the loop formed by the loop structure of the resonator 800. The matcher 830 may adjust the impedance of the resonator 800 by changing the physical shape of the matcher 830. For example, the matcher 830 may include the conductor 831 for the impedance matching in a location separate from the ground conducting portion 813 by a distance "h". The impedance of the resonator 800 may be changed by adjusting the distance "h".

Although not illustrated in FIG. 8, a controller may be provided to control the matcher 830. In one example, the matcher 830 may change the physical shape of the matcher 830 based on a control signal generated by the controller. For example, the distance "h" between the conductor 831 of the matcher 830 and the ground conducting portion 813 may increase or decrease based on the control signal. Accordingly, the physical shape of the matcher 830 may be changed such that the impedance of the resonator 800 may be adjusted. The distance "h" between the conductor 831 of the matcher 830 and the ground conducting portion 831 may be adjusted using a variety of schemes. As one example, a plurality of conductors may be included in the matcher 830 and the distance "h" may be adjusted by adaptively activating one of the conductors. As another example, the distance "h" may be adjusted by adjusting the physical location of the conductor 831 up and down. The distance "h" may be controlled based on the control signal of the controller. The controller may generate the control signal using various factors. An example of the controller generating the control signal will be described later.

As shown in FIG. 8, the matcher 830 may be configured as a passive element such as the conductor 831. Depending on embodiments, the matcher 830 may be configured as an active element, such as a diode, a transistor, and the like. When the active element is included in the matcher 830, the active element may be driven based on the control signal generated by the controller, and the impedance of the resonator 800 may be adjusted based on the control signal. For example, a diode that is a type of the active element may be included in the matcher 830. The impedance of the resonator 800 may be adjusted depending on whether the diode is in an on-state or in an off-state.

Although not illustrated in FIG. 8, a magnetic core may be further provided to pass through the resonator 800 configured as the MNG resonator. The magnetic core may perform a function of increasing a power transmission distance.

Figure 9:
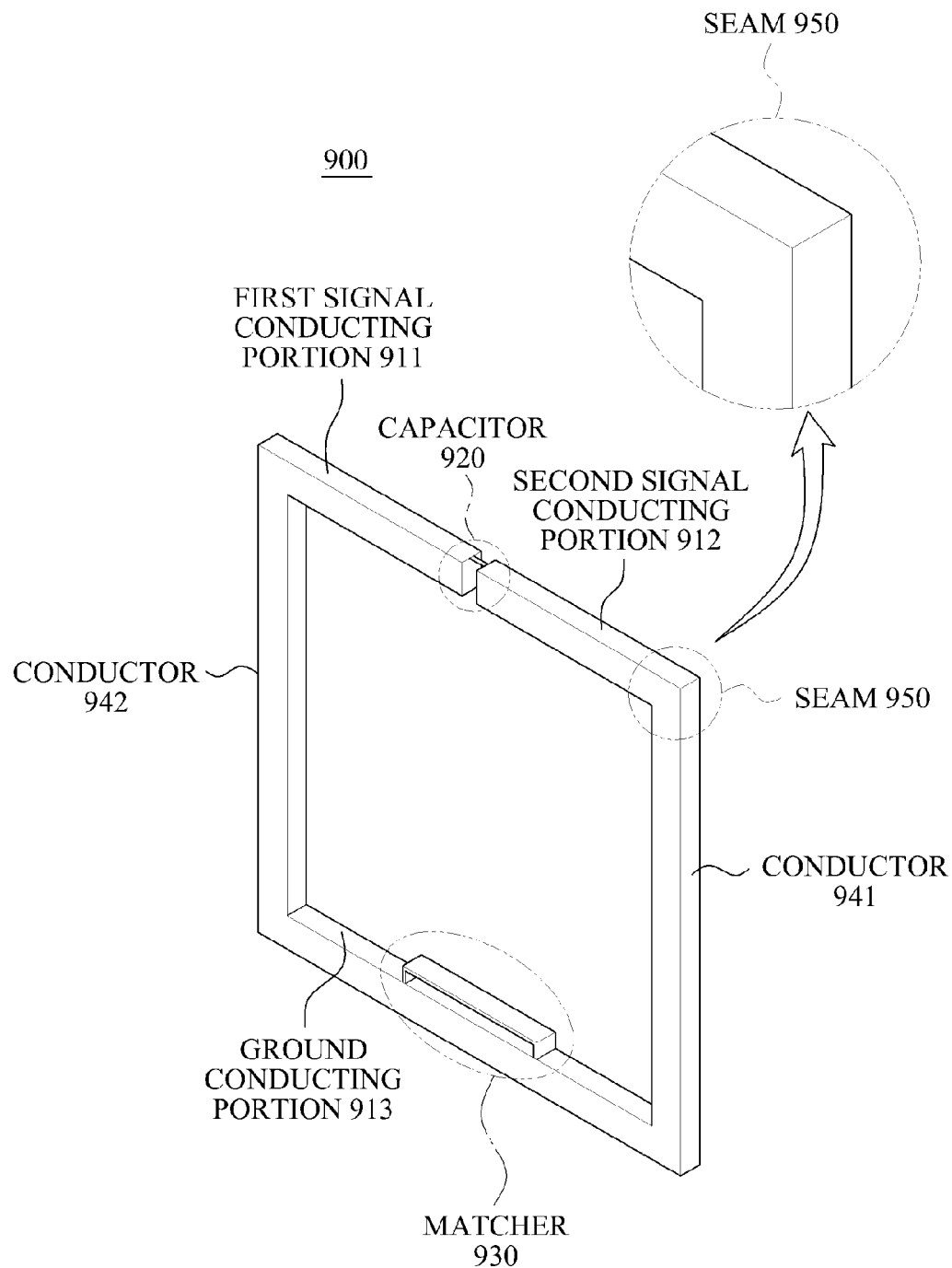

FIG. 9 illustrates an example of a resonator 900 for a wireless power transmission configured as a bulky type.

Referring to FIG. 9, a first signal conducting portion 911 and a second signal conducting portion 912 may be integrally formed instead of being separately manufactured and may be connected to each other. Similarly, the second signal conducting portion 912 and the conductor 941 may also be integrally manufactured.

When the second signal conducting portion 912 and the conductor 941 are separately manufactured and then are connected to each other, a loss of conduction may occur due to a seam 950. The second signal conducting portion 912 and the conductor 941 may be connected to each other without using a separate seam, that is, may be seamlessly connected to each other. Accordingly, it is possible to decrease a conductor loss caused by the seam 950. Accordingly, the second signal conducting portion 912 and the ground conducting portion 931 may be seamlessly and integrally manufactured. Similarly, the first signal conducting portion 911 and the ground conducting portion 931 may be seamlessly and integrally manufactured.

Referring to FIG. 9, a type of a seamless connection connecting at least two partitions into an integrated form is referred to as a bulky type.

Figure 10:
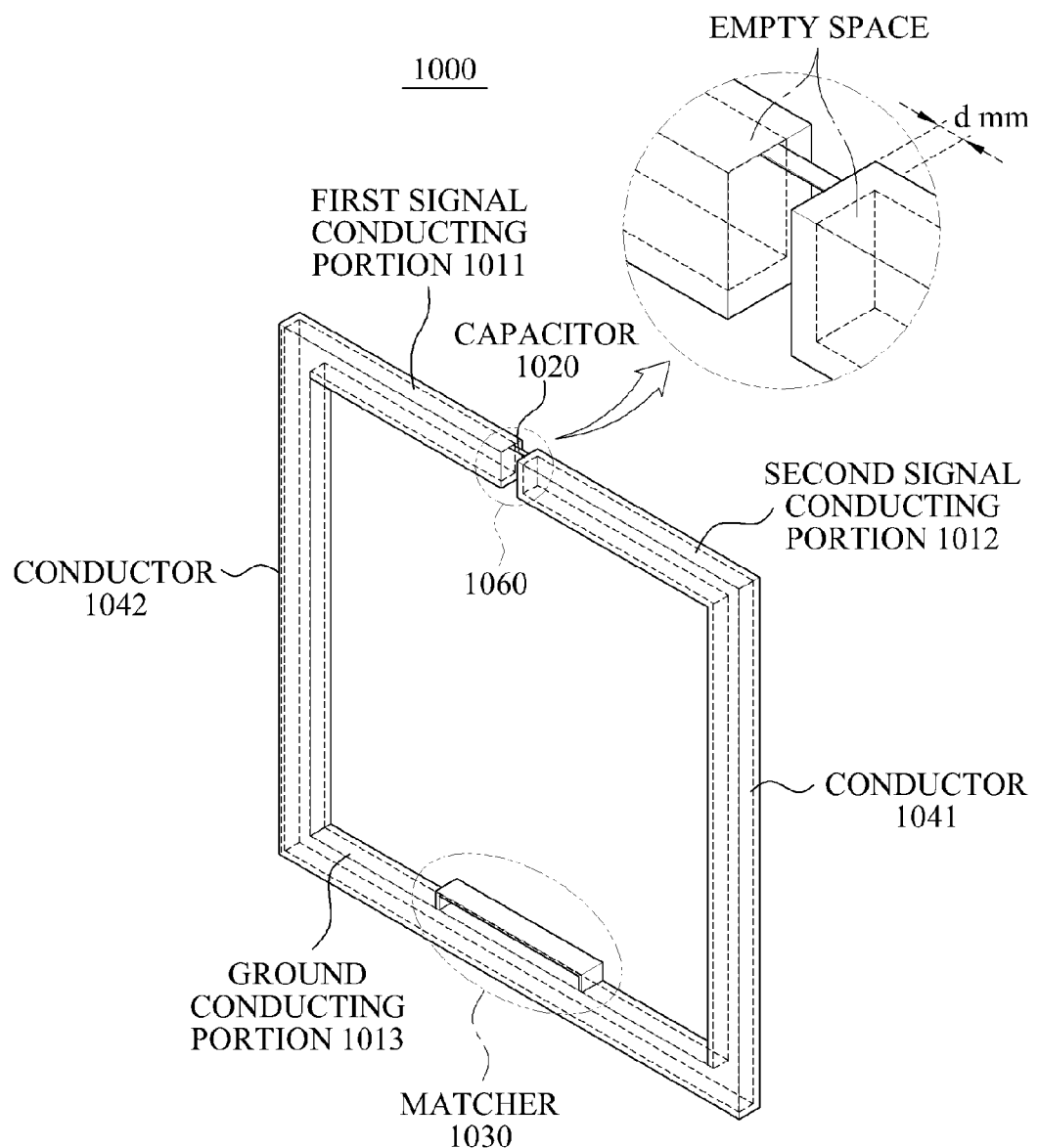

FIG. 10 illustrates an example of a resonator 1000 for a wireless power transmission, configured as a hollow type.

Referring to FIG. 10, each of a first signal conducting portion 1011, a second signal conducting portion 1012, a ground conducting portion 1013, and conductors 1041 and 1042 of the resonator 1000 configured as the hollow type may include an empty space inside.

In a given resonance frequency, an active current may be modeled to flow in only a portion of the first signal conducting portion 1011 instead of all of the first signal conducting portion 1011; the second signal conducting portion 1012 instead of all of the second signal conducting portion 1012; a portion of the ground conducting portion 1013 instead of all of the ground conducting portion 1013; and a portion of the conductors 1041 and 1042 instead of all of the conductors 1041 and 1042. For example, when a depth of each of the first signal conducting portion 1011, the second signal conducting portion 1012, the ground conducting portion 1013, and the conductors 1041 and 1042 is significantly deeper than a corresponding skin depth in the given resonance frequency, it may be less effective. The significantly deeper depth may increase a weight or manufacturing costs of the resonator 1000.

Accordingly, in the given resonance frequency, the depth of each of the first signal conducting portion 1011, the second signal conducting portion 1012, the ground conducting portion 1013, and the conductors 1041 and 1042 may be appropriately determined based on the corresponding skin depth of each of the first signal conducting portion 1011, the second signal conducting portion 1012, the ground conducting portion 1013, and the conductors 1041 and 1042. When each of the first signal conducting portion 1011, the second signal conducting portion 1012, the ground conducting portion 1013, and the conductors 1041 and 1042 has an appropriate depth deeper than a corresponding skin depth, the resonator 1000 may become more lightweight, and manufacturing costs of the resonator 1000 may also decrease.

For example, as shown in FIG. 10, the depth of the second signal conducting portion 1012 may be determined as "d" mm and d may be determined according to $$d = \frac{1}{\sqrt{\pi f \mu \sigma}}.$$

For example, f denotes a frequency, $\mu$ denotes a magnetic permeability, and $\sigma$ denotes a conductor constant. When the first signal conducting portion 1011, the second signal conducting portion 1012, the ground conducting portion 1013, and the conductors 1041 and 1042 are made of a copper and have a conductivity of $5.8 \times 10^7$ siemens per meter (S·m$^{-1}$), the skin depth may be about 0.6 mm with respect to 10 kHz of the resonance frequency and the skin depth may be about 0.006 mm with respect to 100 MHz of the resonance frequency.

Figure 11:
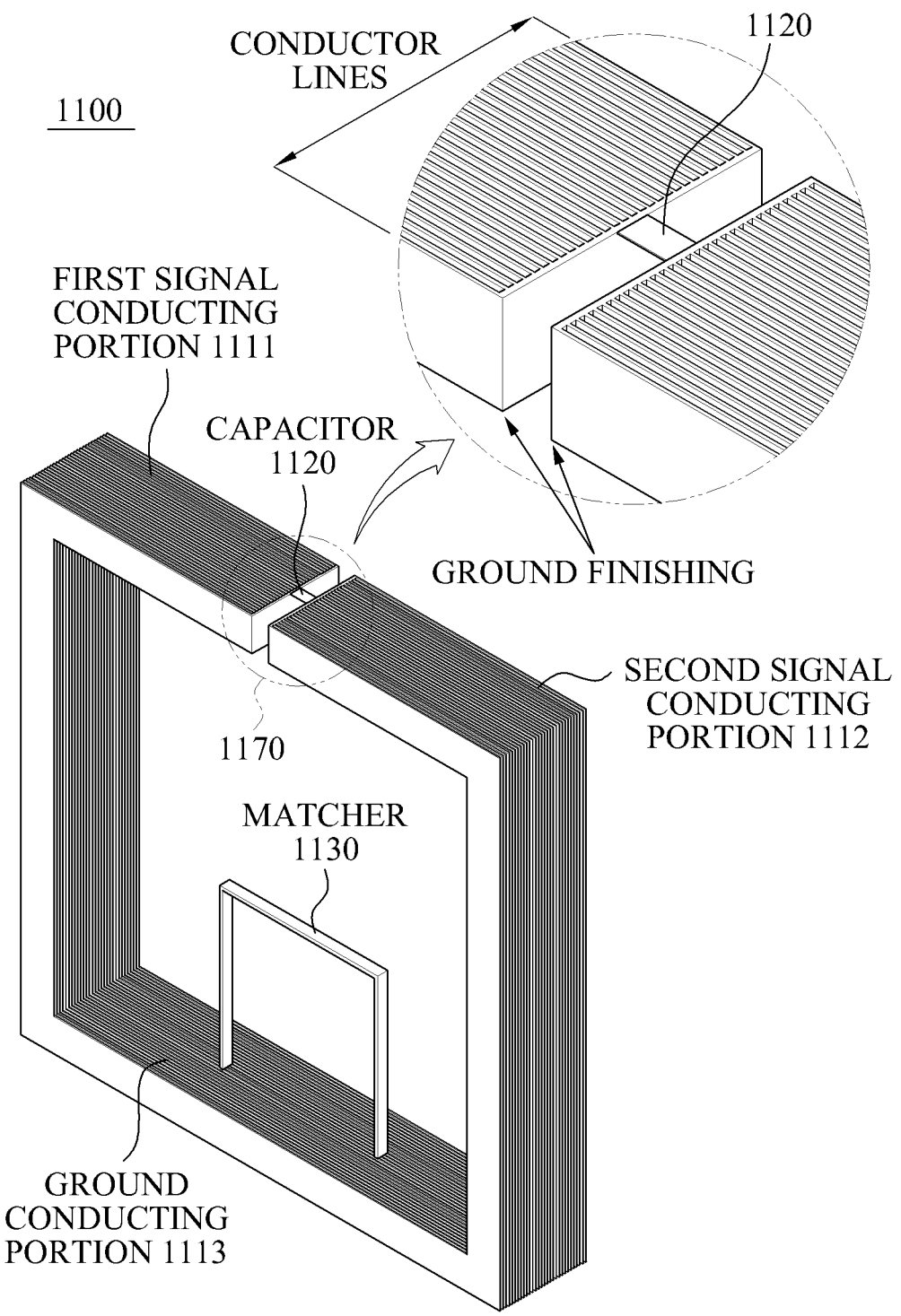

FIG. 11 illustrates an example of a resonator 1100 for a wireless power transmission using a parallel-sheet.

Referring to FIG. 11, the parallel-sheet may be applicable to each of a first signal conducting portion 1111 and a second signal conducting portion 1112 included in the resonator 1100.

Each of the first signal conducting portion 1111 and the second signal conducting portion 1112 may not be a perfect conductor, thus, they may have a resistance. Due to the resistance, an ohmic loss may occur. The ohmic loss may decrease a Q-factor and may also decrease a coupling effect.

By applying the parallel-sheet to each of the first signal conducting portion 1111 and the second signal conducting portion 1112, it may be possible to decrease the ohmic loss, and to increase the Q-factor and the coupling effect. Referring to a portion 1170 indicated by a dashed circle, when the parallel-sheet is applied, each of the first signal conducting portion 1111 and the second signal conducting portion 1112 may include a plurality of conductor lines. The plurality of conductor lines may be disposed in parallel, and may be shorted at an end portion of each of the first signal conducting portion 1111 and the second signal conducting portion 1112.

As described above, when the parallel-sheet is applied to each of the first signal conducting portion 1111 and the second signal conducting portion 1112, the plurality of conductor lines may be disposed in parallel. Accordingly, a sum of resistances having the conductor lines may decrease. Consequently, the resistance loss may decrease, and the Q-factor and the coupling effect may increase.

Figure 12:
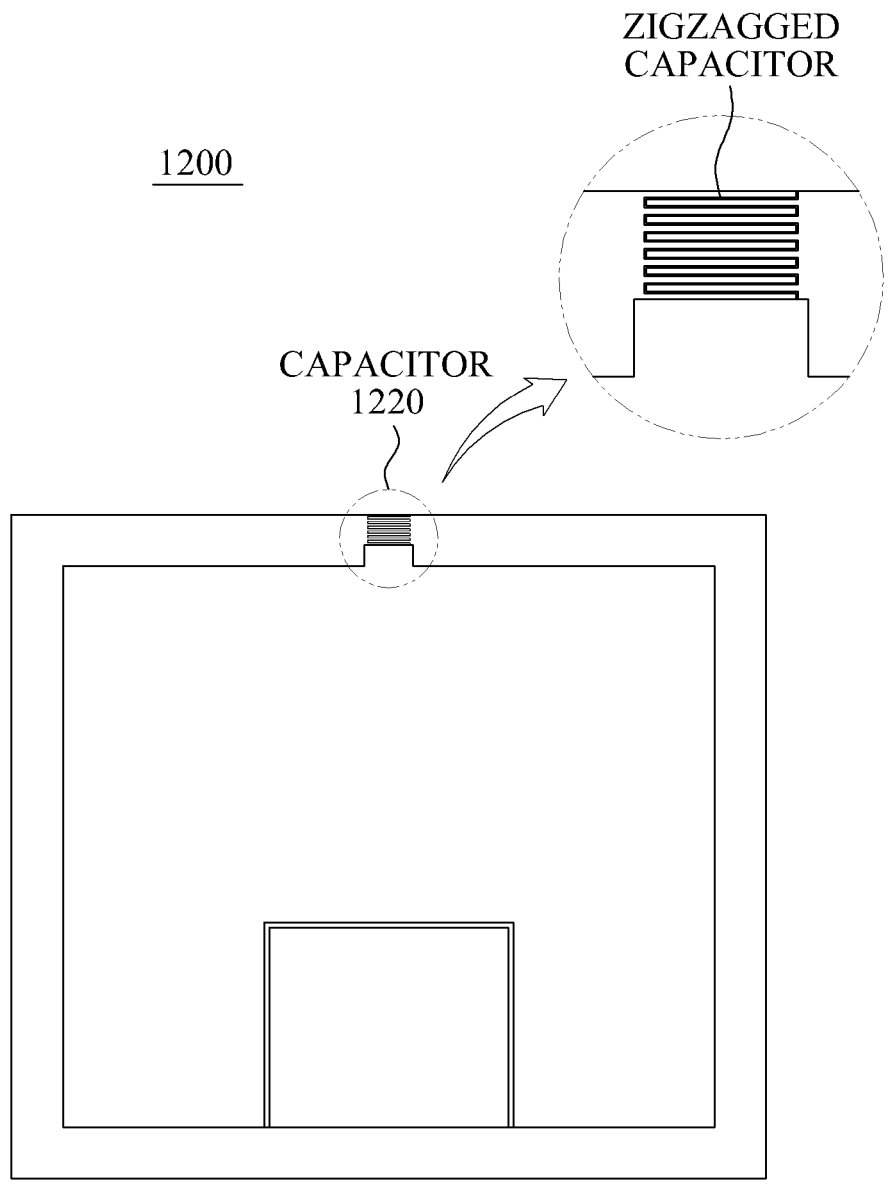

FIG. 12 illustrates an example of a resonator 1200 for a wireless power transmission, including a distributed capacitor.

Referring to FIG. 12, a capacitor 1220 included in the resonator 1200 for the wireless power transmission may be a distributed capacitor. A capacitor as a lumped element may have a relatively high equivalent series resistance (ESR). A variety of schemes have been proposed to decrease the ESR contained in the capacitor of the lumped element. According to an embodiment, by using the capacitor 1220 as a distributed element, it may be possible to decrease the ESR. As is known in the art, a loss caused by the ESR may decrease a Q-factor and a coupling effect.

As shown in FIG. 12, the capacitor 1220 as the distributed element may have a zigzagged structure. For example, the capacitor 1220 as the distributed element may be configured as a conductive line and a conductor having the zigzagged structure.

As shown in FIG. 12, by employing the capacitor 1220 as the distributed element, it may be possible to decrease the loss occurring due to the ESR. In addition, by disposing a plurality of capacitors as lumped elements, it may be possible to decrease the loss occurring due to the ESR. As a resistance of each of the capacitors as the lumped elements may decrease through a parallel connection, active resistances of parallel-connected capacitors as the lumped elements may also decrease, such that the loss occurring due to the ESR may decrease. For example, by employing ten capacitors of 1 pF instead of using a single capacitor of 10 pF, it may be possible to decrease the loss occurring due to the ESR.

Figure 13A:
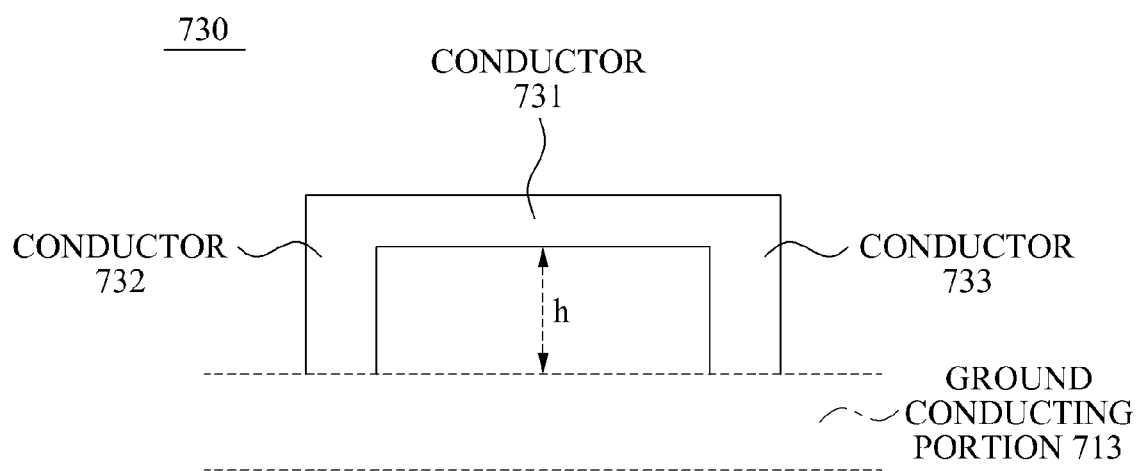
Figure 13B:
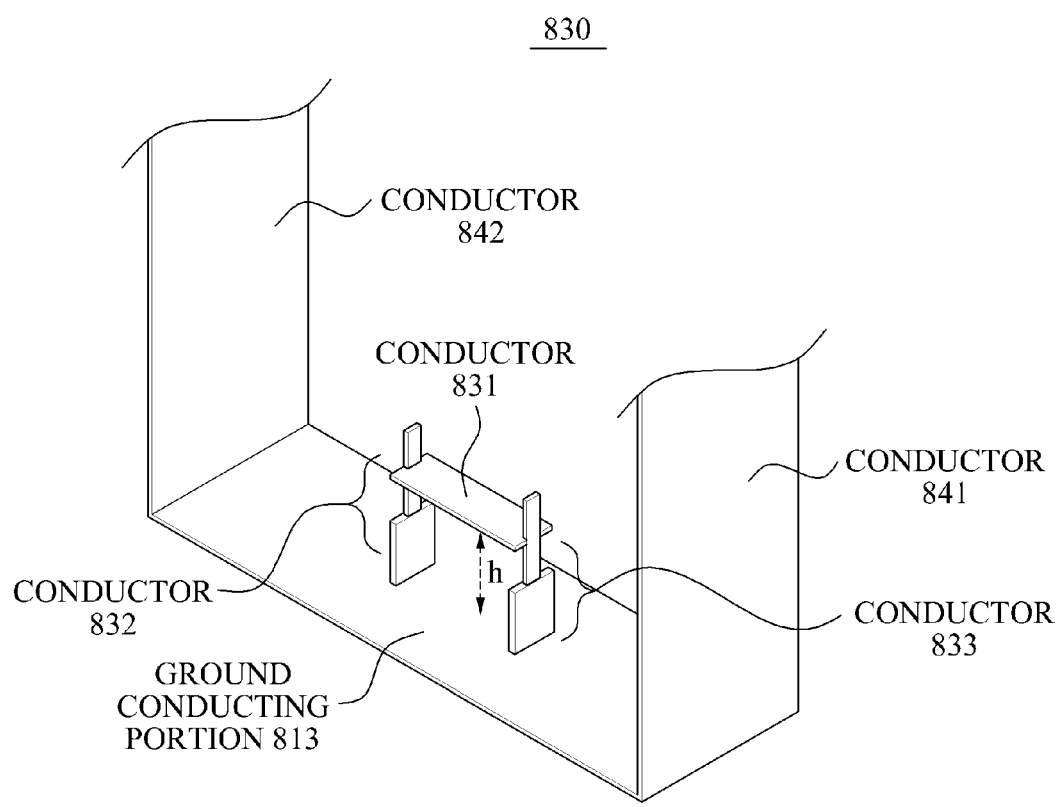

FIG. 13A illustrates an example of the matcher 730 used in the resonator 700 provided in the 2D structure of FIG. 7. FIG. 13B illustrates an example of the matcher 830 used in the resonator 800 provided in the 3D structure of FIG. 8.

Specifically, FIG. 13A illustrates a portion of the 2D resonator including the matcher 730, and FIG. 13B illustrates a portion of the 3D resonator of FIG. 8 including the matcher 830.

Referring to FIG. 13A, the matcher 730 may include the conductor 731, a conductor 732, and a conductor 733. The conductors 732 and 733 may each be connected to the ground conducting portion 713 and the conductor 731. The impedance of the 2D resonator may be determined based on a distance "h" between the conductor 731 and the ground conducting portion 713. The distance "h" between the conductor 731 and the ground conducting portion 713 may be controlled by the controller. The distance "h" between the conductor 731 and the ground conducting portion 713 may be adjusted using a variety of schemes. For example, the variety of schemes may include a scheme of adjusting the distance "h" by adaptively activating one or more of the conductors 731, 732, and 733, a scheme of adjusting the physical location of the conductor 731 up and down, and the like.

Referring to FIG. 13B, the matcher 830 may include the conductor 831, a conductor 832, and a conductor 833. The conductors 832 and 833 may be connected to the ground conducting portion 813 and the conductor 831. The conductors 832 and 833 may be connected to the ground conducting portion 813 and the conductor 831. The impedance of the 3D resonator may be determined based on a distance "h" between the conductor 831 and the ground conducting portion 813. The distance "h" between the conductor 831 and the ground conducting portion 813 may be controlled by the controller. Similarly to the matcher 730 included in the 2D structured resonator, in the matcher 830 included in the 3D structured resonator, the distance "h" between the conductor 831 and the ground conducting portion 813 may be adjusted using a variety of schemes. For example, the variety of schemes may include a scheme of adjusting the distance "h" by adaptively activating one or more of the conductors 831, 832, and 833, a scheme of adjusting the physical location of the conductor 831 up and down, and the like.

Although not illustrated in FIGS. 13A and 13B, the matcher may include an active element. A scheme of adjusting an impedance of a resonator using the active element may be similar to that described above. For example, the impedance of the resonator may be adjusted by changing a path of a current flowing through the matcher using the active element.

Figure 14:
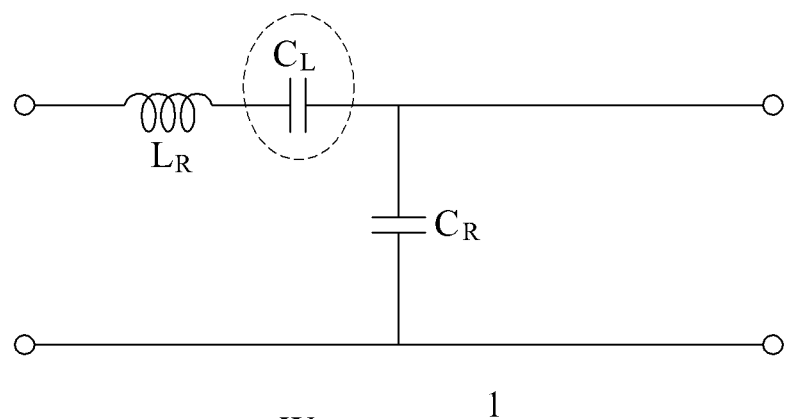
FIG. 14 is a diagram illustrating an example of an equivalent circuit of the resonator for a wireless power transmission of FIG. 7.

FIG. 14 illustrates an example of an equivalent circuit of the resonator 700 for the wireless power transmission of FIG. 7.

The resonator 700 for the wireless power transmission may be modeled to the equivalent circuit of FIG. 14. In the equivalent circuit of FIG. 14, $C_L$ denotes a capacitor that is inserted, e.g., in a form of a lumped element in the middle of the transmission line of FIG. 7.

The resonator 700 may have a zeroth resonance characteristic. For example, when a propagation constant is "0", the resonator 700 may be presumed to have $\omega_{MZR}$ as a resonance frequency. The resonance frequency $\omega_{MZR}$ may be expressed according to Equation 6.

$$\omega_{MZR} = \frac{1}{\sqrt{L_R C_L}} \quad \text{[Equation 6]}$$

In Equation 6, MZR denotes a Mu (μ) zero resonator.

Referring to Equation 6, the resonance frequency $\omega_{MZR}$ of the resonator 700 may be determined by $$L_R / C_L.$$

A physical size of the resonator 700 and the resonance frequency $\omega_{MZR}$ may be independent with respect to each other. As the physical sizes are independent with respect to each other, the physical size of the resonator 700 may be sufficiently reduced.

As a non-exhaustive illustration only, the devices described herein may be incorporated in or used in conjunction with mobile devices such as a cellular phone, a personal digital assistant (PDA), a digital camera, a portable game console, and an MP3 player, a portable/personal multimedia player (PMP), a handheld e-book, a portable tablet and/or laptop computer, a global positioning system (GPS) navigation, and devices such as a desktop PC, a high definition television (HDTV), an optical disc player, a setup and/or set top box, and the like, consistent with that disclosed herein. For example, the resonance power receiving apparatus may be any device that requires a power source, e.g., a battery, to be charged, and is not limited to the above-described example of a laptop computer.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for controlling a resonance bandwidth in a wireless power transmission system, the apparatus comprising:
a source resonator configured to transfer an electromagnetic energy to a target resonator;
a source resonance bandwidth setting unit configured to set a resonance bandwidth of the source resonator; and
a source controller configured to
verify a demand power of a target device;
control the source resonance bandwidth setting unit to set a Q-factor of the source resonator to be within a first range in response to the demand power of the target device being less than a setting value; and
control the source resonance bandwidth setting unit to set the Q-factor of the source resonator to be within a second range in response to the demand power of the target device being equal to or greater than the setting value,
wherein the Q-factor of the source resonator and a Q-factor of the target resonator are set to be different from each other.

2. The apparatus of claim 1, wherein:
the source resonance bandwidth setting unit is further configured to set the resonance bandwidth of the source resonator to be a value obtained by subtracting a first frequency from a second frequency based on a central frequency; and
the value of subtracting the first frequency from the second frequency is less than 1/1.1 times the resonance bandwidth of the target resonator.

3. The apparatus of claim 1, wherein:
the source resonance bandwidth setting unit is further configured to set the resonance bandwidth of the source resonator to be a value obtained by subtracting a third frequency from a fourth frequency based on a central frequency; and
the value of subtracting the third frequency from the fourth frequency is greater than 1.1 times the resonance bandwidth of the target resonator.

4. The apparatus of claim 1, wherein:
the first range comprises values less than 100; and
the second range comprises values from 100 to 3000.

5. An apparatus for controlling a resonance bandwidth in a wireless power transmission system, the apparatus comprising:
a target resonator configured to receive an electromagnetic energy from a source resonator;
a target resonance bandwidth setting unit configured to set a resonance bandwidth of the target resonator,
wherein Q factors of the source resonator and the target resonator are set to be different from each other, and
wherein the target resonance bandwidth setting unit is further configured to set the resonance bandwidth of the target resonator, based on information regarding setting of the Q factor of the resonance bandwidth of the source resonator within a first range in response to the demand power of the target device being less than a setting value and setting of the Q-factor of the source resonator to be within a second range in response to the demand power of the target device being equal to or greater than the setting value.

6. The apparatus of claim 5, wherein:
the target resonance bandwidth setting unit is further configured to set the resonance bandwidth of the target resonator to be a value obtained by subtracting a first frequency from a second frequency based on a central frequency; and the value of subtracting the first frequency from the second frequency is less than 1/1.1 times the resonance bandwidth of the source resonator.

7. The apparatus of claim 5, wherein:
the target resonance bandwidth setting unit is further configured to set the resonance bandwidth of the target resonator to be a value obtained by subtracting a third frequency from a fourth frequency based on a central frequency; and
the value of subtracting the third frequency from the fourth frequency is greater than 1.1 times the resonance bandwidth of the source resonator.

8. The apparatus of claim 5, further comprising a communication unit configured to:
receive information regarding the resonance bandwidth of the source resonator;
provide the received information to the target resonance bandwidth setting unit; and
transmit, to a source device, information regarding the resonance bandwidth of the target resonator.

9. An apparatus for controlling a resonance bandwidth in a wireless power transmission system, the apparatus comprising:
a source resonator configured to transfer an electromagnetic energy to a target resonator;
a source matching frequency setting unit configured to set an impedance matching frequency of the source resonator;
a target matching frequency setting unit configured to set an impedance matching frequency of the target resonator; and
a source controller configured to
verity a demand power of a target device;
control a source resonance bandwidth setting unit to set a Q-factor of the source resonator to be within a first range in response to the demand power of the target device being less than a setting value; and
control the source resonance bandwidth setting unit to set the Q-factor of the source resonator to be within a second range in response to the demand power of the target device being equal to or greater than the setting value,
wherein the Q factor of the source resonator and a Q factor of the target resonator are set to be different from each other.

10. The apparatus of claim 9, wherein:
the source matching frequency setting unit is further configured to set the bandwidth of the impedance matching frequency of the source resonator to be a value obtained by subtracting a first frequency from a second frequency based on a central frequency; and
the value of subtracting the first frequency from the second frequency is greater than twice the bandwidth of the impedance matching frequency of the target resonator.

11. The apparatus of claim 9, wherein:
the source matching frequency setting unit is further configured to set the bandwidth of the impedance matching frequency of the source resonator to be a value obtained by subtracting a first frequency from a second frequency based on a central frequency; and
the value of subtracting the first frequency from the second frequency is greater than ½ times the bandwidth of the impedance matching frequency of the target resonator.

12. A method of controlling a resonance bandwidth in a wireless power transmission system, the method comprising:
setting a resonance bandwidth of a source resonator and a resonance bandwidth of a target resonator; and
transferring an electromagnetic energy from the source resonator to the target resonator through a magnetic coupling between the source resonator and the target resonator,
wherein the setting comprises
verifying a demand power of a target device;
setting the resonance bandwidth of the source resonator such that a Q-factor of the source resonator is within a first range in response to the demand power of the target device being less than a setting value; and
setting the resonance bandwidth of the source resonator such that the Q-factor of the source resonator is within a second range in response to the demand power of the target device being equal to or greater than the setting value, and
wherein Q factors of the source resonator and the target resonator are set to be different from each other.

13. The method of claim 12, wherein:
the resonance bandwidth of the source resonator is set to be a value obtained by subtracting a first frequency from a second frequency based on a central frequency; and
the value of subtracting the first frequency from the second frequency is greater than twice the resonance bandwidth of the target resonator.

14. The method of claim 12, wherein:
the resonance bandwidth of the source resonator is set to be a value obtained by subtracting a first frequency from a second frequency based on a central frequency; and
the value of subtracting the first frequency from the second frequency is greater than ½ times the resonance bandwidth of the target resonator.

15. The method of claim 12, wherein:
the first range comprises values less than 100; and
the second range comprises values from 100 to 3000.

16. The method of claim 12, wherein the setting comprises:
sharing information regarding the resonance bandwidth of the source resonator and information regarding the resonance bandwidth of the target resonator between a source device and a target device, according to a communication scheme; and
setting the resonance bandwidth of the source resonator and the resonance bandwidth of the target resonator, based on the information regarding the resonance bandwidth of the source resonator and the information regarding the resonance bandwidth of the target resonator.

17. The apparatus of claim 1, wherein the resonance bandwidth of the source resonator and the resonance bandwidth of the target resonator have a same central frequency.

* * * * *